US012807200B1

(12) United States Patent
Thola

(10) Patent No.: US 12,807,200 B1
(45) Date of Patent: Nov. 24, 2026

(54) HAND-TRUCK LIFT SYSTEM AND METHOD OF LIFTING A TRAILER HITCH

(71) Applicant: Del Thola, Benson, AZ (US)

(72) Inventor: Del Thola, Benson, AZ (US)

(73) Assignee: U-NO-LIFT, LLC, Benson, AZ (US)

( * ) Notice: Subject to any disclaimer, the term of this patent is extended or adjusted under 35 U.S.C. 154(b) by 334 days.

(21) Appl. No.: 18/427,811

(22) Filed: Jan. 30, 2024

Related U.S. Application Data

(60) Provisional application No. 63/442,463, filed on Feb. 1, 2023.

(51) Int. Cl.
*B62B 1/14* (2006.01)

(52) U.S. Cl.
CPC ............. *B62B 1/14* (2013.01); *B62B 2203/11* (2013.01)

(58) Field of Classification Search
CPC ......... B62B 1/14; B62B 2203/11; B62B 1/02; B62B 1/06; B62B 1/04; B62B 1/12; B62B 5/0485; B62B 5/0433; B62B 1/16; B62B 1/24; B62B 1/147
USPC ........................................................ 414/490
See application file for complete search history.

(56) References Cited

U.S. PATENT DOCUMENTS 1,425,999 A * 8/1922 Morrow ................ B60P 1/4407 254/3 R
2,135,802 A * 11/1938 Dinkins ................ B60B 29/002 414/428
2,440,681 A 5/1948 Gordon
2,572,945 A * 10/1951 Quesnoit ................... B62B 1/22 414/494
3,825,134 A * 7/1974 Stobb ...................... B65H 29/18 414/789.9
4,015,686 A 4/1977 Bushnell, Jr.
4,052,080 A * 10/1977 Hedderich ................ B62B 3/04 414/490
4,756,540 A * 7/1988 Crawford ................ B62B 1/264 280/47.21
4,934,659 A 6/1990 Yoke
5,294,136 A * 3/1994 Dick .......................... B62B 5/02 254/323
7,597,522 B2 * 10/2009 Borntrager ............. B62D 51/04 180/19.1
7,832,709 B2 * 11/2010 O'Connor ................ H02G 1/08 254/134.3 R
8,192,134 B2 * 6/2012 Brewer, III ............... B62B 1/14 414/490
8,240,683 B1 8/2012 Haslup, Sr.
10,137,747 B2 11/2018 Dietzenbach
(Continued)

*Primary Examiner* — Sameh Tawfik
(74) *Attorney, Agent, or Firm* — Invention To Patent Services; Alex Hobson

(57) ABSTRACT

A hand-truck lift system utilizes a hand-truck with a lift system to enable a trailer to be lifted for connection to a hitch. The hand-truck may be used for conventional hand-truck purposes as it has a pair of wheels, a vertically extending frame with a handle and a lift platform extending from the frame to allow boxes or other items to be lifted and transported by tiling the frame and lift platform backward and then pushing or pulling the handle. A lift system includes a lift mechanism, such as a motor that is coupled to a cable to retract the cable for lifting the connection end of a trailer. The lift system may include a pulley to guide the cable to the lift mechanism such as a reel.

18 Claims, 6 Drawing Sheets

(56) References Cited

U.S. PATENT DOCUMENTS

| | | | | |
|---|---|---|---|---|
| 2010/0013178 | A1* | 1/2010 | Blair | B62B 1/06 280/47.27 |
| 2012/0090921 | A1 | 4/2012 | Janz | |
| 2013/0327999 | A1 | 12/2013 | West | |

* cited by examiner

HAND-TRUCK LIFT SYSTEM AND METHOD OF LIFTING A TRAILER HITCH

CROSS REFERENCE TO RELATED APPLICATIONS

This application claims the benefit of priority to U.S. provisional patent application No. 63/442,463 filed on Feb. 1, 2023; the entirety of which is hereby incorporated by reference herein.

BACKGROUND OF THE INVENTION

Field of the Invention

The invention relates to a hand-truck incorporating a lift system to enable a trailer to be lifted for connection to a hitch.

Background

Lifting a trailer to couple with a hitch of a vehicle can be very difficult as the ball end of the trailer may be heavy and maneuvering the ball end to connect it with the hitch can result in injury. There are many types of businesses that routinely need to move objects, boxes and also require trailers to be hooked up and detached from vehicles. U-Haul, Home Depot are examples of businesses that have customers that rent trailers and require the trailer to be connected to their vehicle. These two businesses also have many box and object moving requirements. Employees often aid in attaching a trailer to the customer's vehicle and as described herein, this is heavy and dangerous work.

SUMMARY OF THE INVENTION

The invention is directed to a hand-truck lift system that utilizes a hand-truck with a lift system to enable a trailer to be lifted for connection to a hitch. The hand-truck may be used for conventional hand-truck purposes as it has a pair of wheels, a vertically extending frame with a handle and a lift platform extending from the frame to allow boxes or other items to be lifted and transported by tiling the frame and lift platform backward and then pushing or pulling the handle. A lift system includes a lift mechanism, such as a motor that is coupled to a cable to retract the cable for lifting the connection end of a trailer. The lift system may include one or more pulleys to guide the cable from the frame loading side of the hand-truck frame to the lift mechanism. The lift mechanism may be configured or extend out to the side or back of the frame to allow boxes or other items to be stacked along the frame loading side of the frame for transport. Also, the frame may comprise a concave or recessed portion and the lift mechanism and/or a pulley of the lift system may be configured in this recess, such that objects to be moved by the hand-truck, may rest along side beams. The recessed portion may be configured between the side beams.

In an exemplary embodiment, the lift mechanism is powered by a battery that is coupled to the hand-truck, such as on the frame handle side of the handle and proximal the bottom of the frame. Note that the battery may be configured up from the base of the frame to allow enough room for the frame to be tilted backward about the wheels to elevate the lift platform up off the ground for transport. The battery may be powered by a solar panel that is also coupled to the hand-truck. The hand-truck lift system may therefore by an integral system including all of the components required to power the lift mechanism.

The frame may suitable for hand operation and therefore may weigh less than about 100 lbs, or even no more than about 75 lbs. The frame has a handle to enable hand operation. The frame may have a frame height of about 1.0 m or more, about 1.2 m or more, about 1.5 m or more and any arrange between and including the frame heights listed.

A method of both lifting a lift-object and transporting a platform-object is enable by the multifunctional hand-truck. A lift coupler, attached to a cable extending from a lift mechanism, may be attached to a lift-object, such as a trailer or the hitch of a trailer, and then the motor may be turned on to retract the cable by the lift mechanism. The lift-object is then lifted by the tension in the cable. Also, a platform-object, such as a box, may be configured on the lift platform and the handle end of the frame may be tilted back to lift the lift platform and the platform-object thereon. The multifunctional hand-truck therefore is useful for these two functions, lifting a lift-object by the cable and motor, and also transporting a platform-object on via the frame and wheels coupled to the frame.

The summary of the invention is provided as a general introduction to some of the embodiments of the invention, and is not intended to be limiting. Additional example embodiments including variations and alternative configurations of the invention are provided herein.

BRIEF DESCRIPTION OF SEVERAL VIEWS OF THE DRAWINGS

The accompanying drawings are included to provide a further understanding of the invention and are incorporated in and constitute a part of this specification, illustrate embodiments of the invention, and together with the description serve to explain the principles of the invention.

Figure 1:
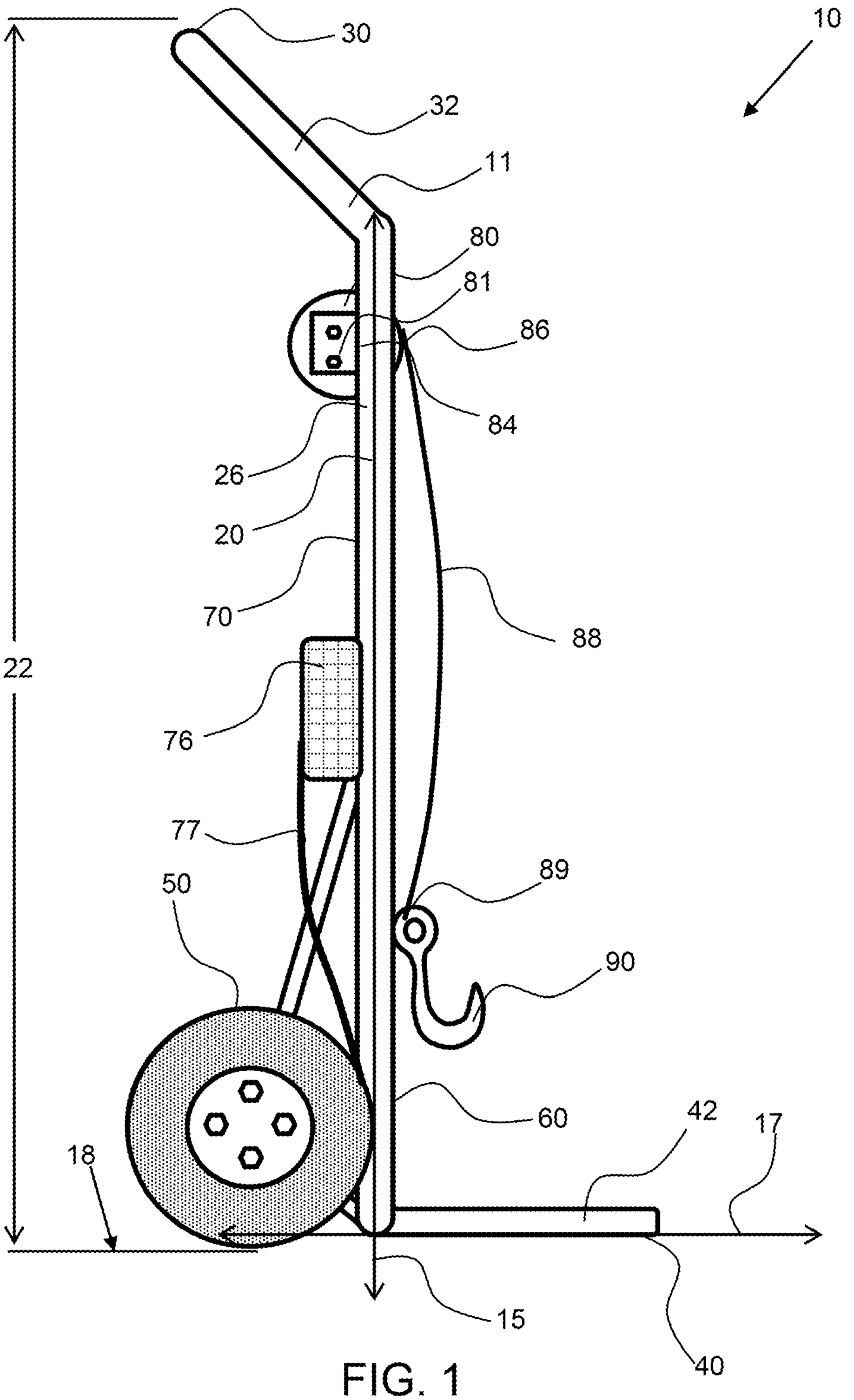
FIG. 1 shows a side view of an exemplary hand-truck lifting system comprising a hand-truck with a lift mechanism coupled thereto and having a lift coupler on a cable that is retracted by the lift mechanism.

Corresponding reference characters indicate corresponding parts throughout the several views of the figures. The figures represent an illustration of some of the embodiments of the present invention and are not to be construed as limiting the scope of the invention in any manner. Further, the figures are not necessarily to scale, some features may be exaggerated to show details of particular components. Therefore, specific structural and functional details disclosed herein are not to be interpreted as limiting, but merely as a representative basis for teaching one skilled in the art to variously employ the present invention.

DETAILED DESCRIPTION OF THE ILLUSTRATED EMBODIMENTS

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Also, use of "a" or "an" are employed to describe elements and components described herein. This is done merely for convenience and to give a general sense of the scope of the invention. This description should be read to include one or at least one and the singular also includes the plural unless it is obvious that it is meant otherwise.

Certain exemplary embodiments of the present invention are described herein and are illustrated in the accompanying figures. The embodiments described are only for purposes of illustrating the present invention and should not be interpreted as limiting the scope of the invention. Other embodiments of the invention, and certain modifications, combinations and improvements of the described embodiments, will occur to those skilled in the art and all such alternate embodiments, combinations, modifications, improvements are within the scope of the present invention.

Figure 2:
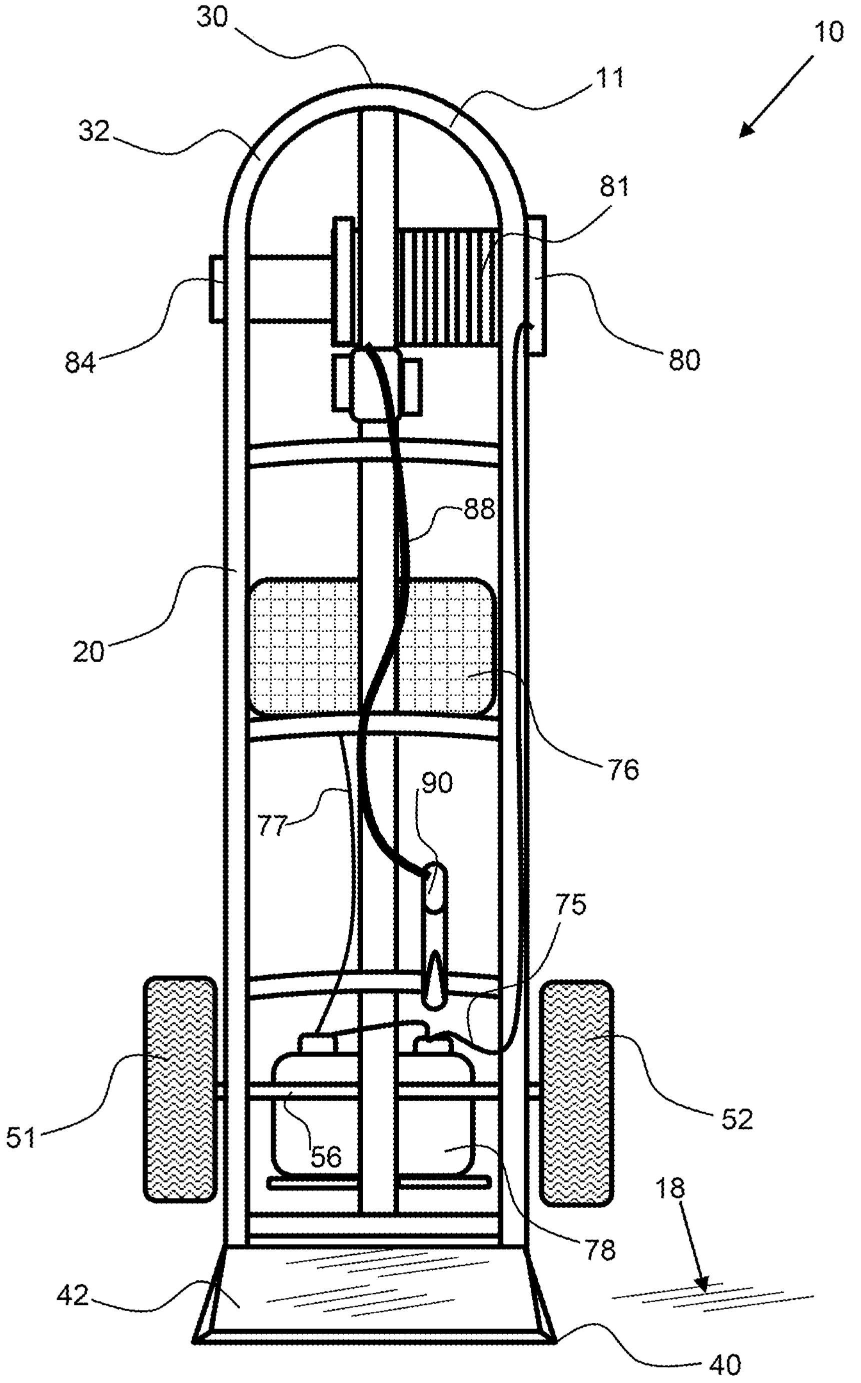
FIG. 2 shows a front view of the exemplary hand-truck lifting system shown in FIG. 1 with the cable extending up along the frame over a pulley to the lift mechanism, a motor.
Figure 3:
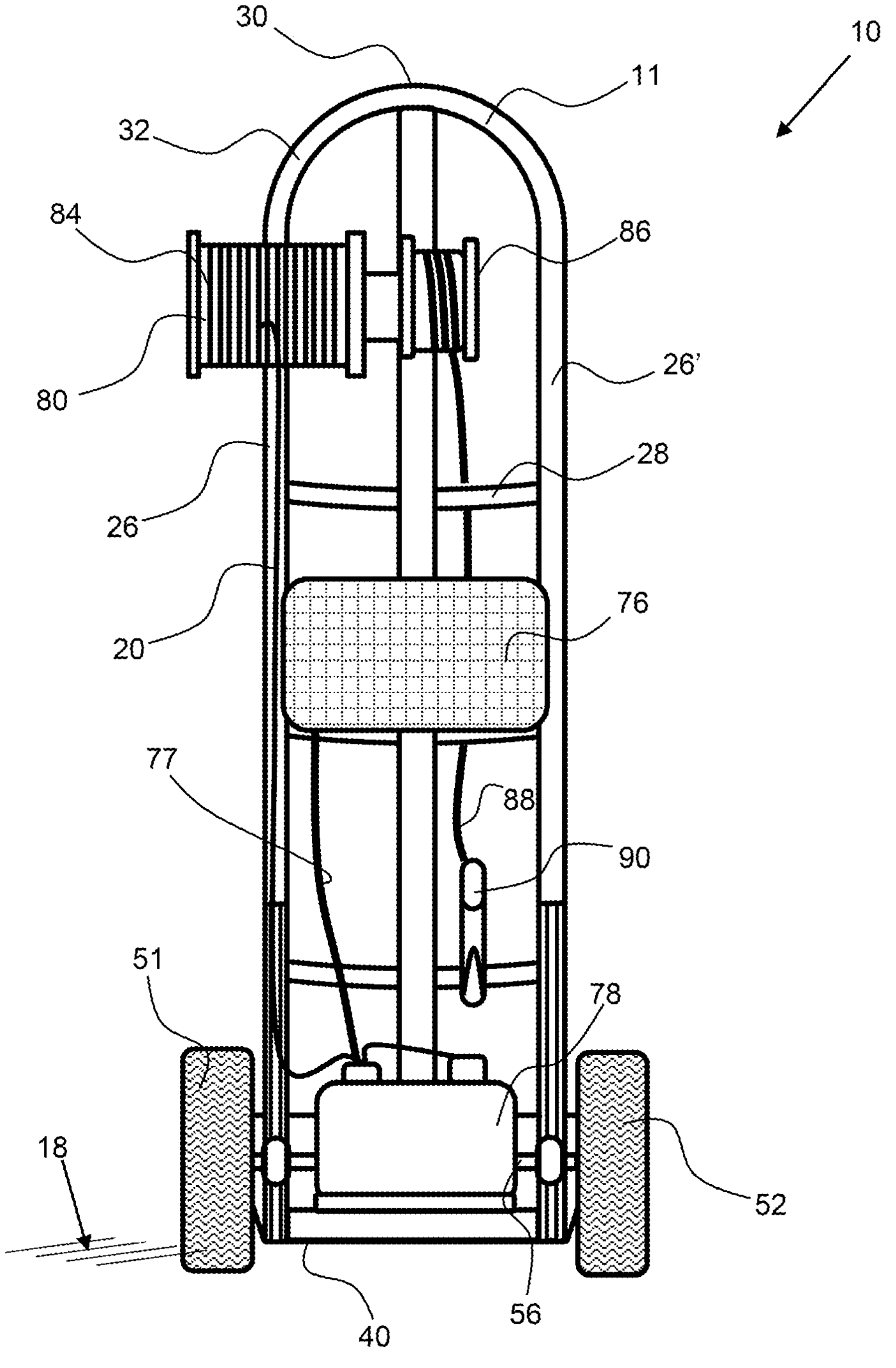
FIG. 3 shows a back view of the exemplary hand-truck lifting system shown in FIG. 1 with the cable extending up along the frame over a pulley to the lift mechanism, a motor.

Referring now to FIGS. 1 to 3, an exemplary hand-truck lifting system 10 comprises a hand-truck 11 with a lift mechanism 80, such as an electrical motor 84, coupled thereto and having a lift coupler 90 on a cable 88 that is retracted by the lift mechanism. The hand-truck 11 has components of a conventional hand-truck including a pair of wheels 50 coupled to a frame 20 by a wheel axle 56 that enables the frame to be tilted back about the wheels by the handle 32 to lift the lift platform 42 up from a ground surface 18. The frame has a frame loading side 60 for receiving items, such as boxes, thereon the lift platform for transport and an opposing or back side, the frame handle side 70 that has a handle 32 for tilting the frame 20 and maneuvering the hand-truck 11.

The hand-truck frame 20 has a frame length 22 from a base end 40 to a handle end 30, or top of the frame. The frame generally extends vertically, or up along a vertical axis 15 when the lift platform 42 is resting on a ground surface 18 that is horizontal, such as a concrete pad. The handle 32 may be the top of the frame or may be extend out from the frame handle side 70 of the frame. The lift platform 42 extends from the frame loading side 60 of the frame 20. The first wheel 51 and second wheel 52 are configured on opposing sides of the frame 20.

The frame has frame supports 24 that are typically metal rods or tubes. As described herein, the frame has side beams 26, 26' that extend up from the base and may produce a recessed portion between the side beams for locating the lift mechanism 80 or a pulley 86 of the lift system 81. Cross supports 28 may be concave between the two side beams 26, 26' when viewed from the front of the hand-truck frame 20. This concave cross support may provide space for a pulley or portions of the lift system 81, such as the lift mechanism 80, such as a motor. Objects to be moved by the hand-truck, such as boxes, may rest along the side beams 26, 26' when the hand-truck is tilted backward and therefore the objects may not be offset by the lift system 81, recessed from the side beams.

The lifting mechanism 80 is configured such that it does not impede or intercept with packages laying against the frame loading side 60 of the frame 20, wherein the lifting mechanism is configured to the side and/or on the frame handle side of the frame 20. As best shown in FIG. 3, the lifting mechanism 80, an electric motor 84 is configured on the frame handle side 70 and the cable 88 extends over a pulley 86 to the frame loading side 60 of the frame 20 and down to an extended end 89. The cable extends down along the frame loading side 60 to a lift coupler 90, such as a clip or buckle or hook.

As shown in FIGS. 1 to 3, the electric motor 84 may be powered by a battery 78 by a power connector 75 that extends from the battery to the electric motor 84. The battery may be a rechargeable battery and may receive power from a solar panel 76 through a charging cable 77. The lift system 81 may therefore be an integral lift system having all the component required to power the lift mechanism coupled to the frame 20 of the hand-truck 11.

Figure 4:
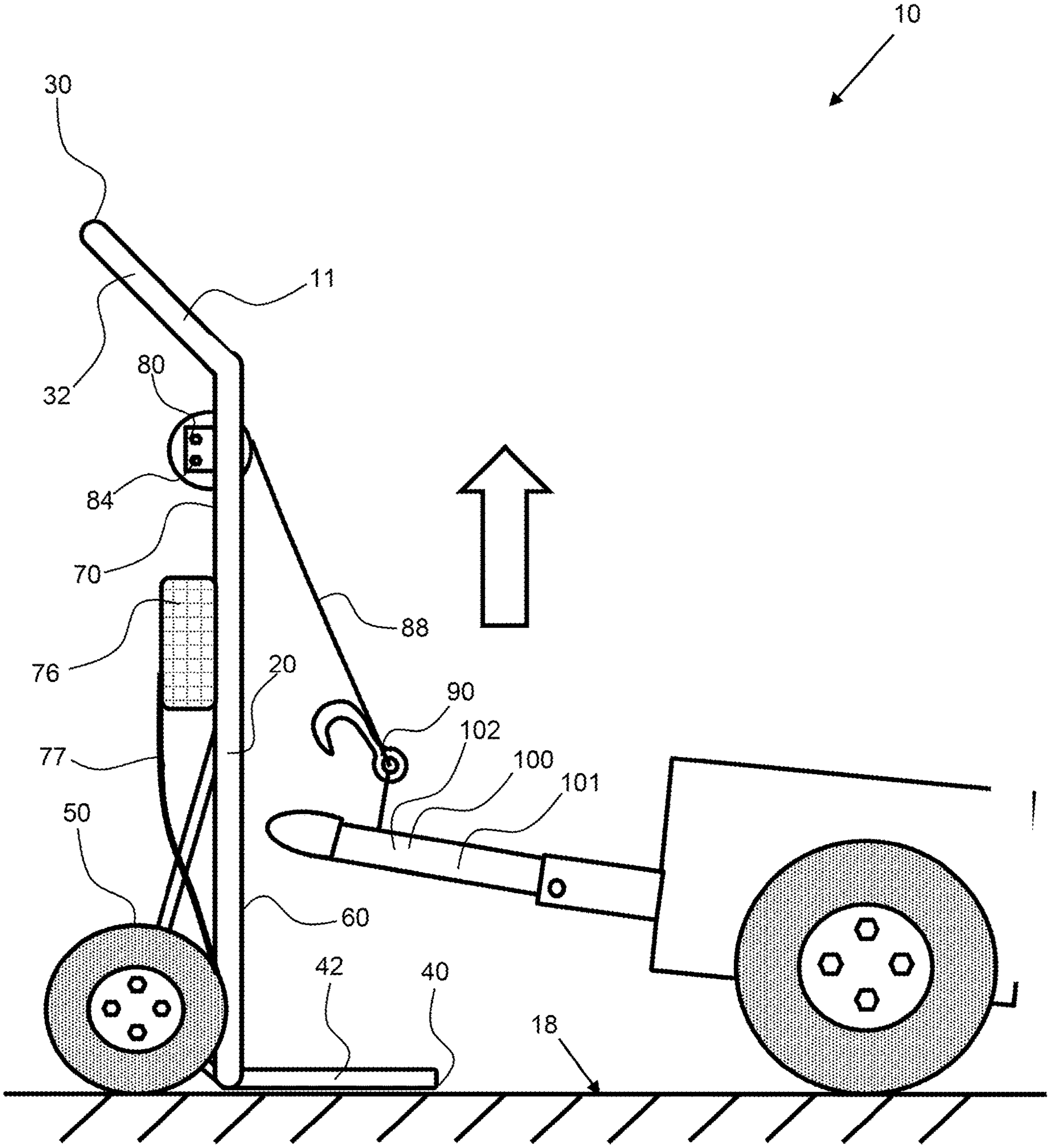
FIG. 4 shows a side view of the exemplary hand-truck lifting system shown in FIGS. 1 to 3, being used to lift a trailer for connection to a vehicle, not shown.
Figure 5:
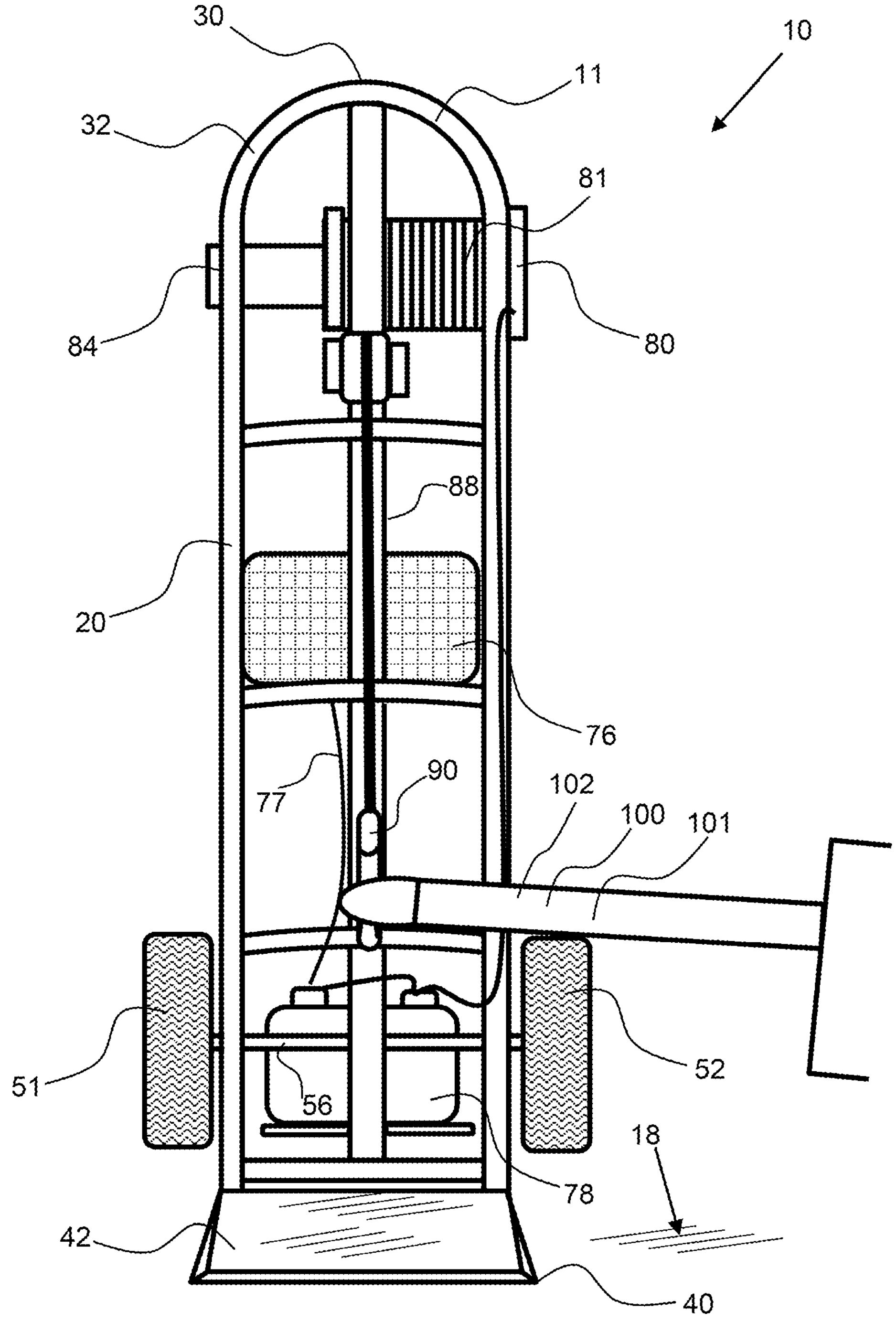
FIG. 5 shows a front view of the exemplary hand-truck lifting system shown in FIGS. 1 to 3, being used to lift a trailer for connection to a vehicle, not shown.

As shown in FIGS. 4 and 5, the cable 88 extends from the electric motor 84 to a trailer 101, an example of an object 100 to be lifted, such as a trailer tongue 102 to lift the trailer 101. Note that the hitch of a vehicle may be positioned proximal to connecting end of the trailer, such that the ball of the hitch can be easily positioned under the connecting end of the trailer. The hand-truck 11 may be configured to the side for this purpose. The hand truck, as shown in FIG. 4, is at the end of the trailer 101 or end of the trailer tongue 102, for clarity.

Figure 6:
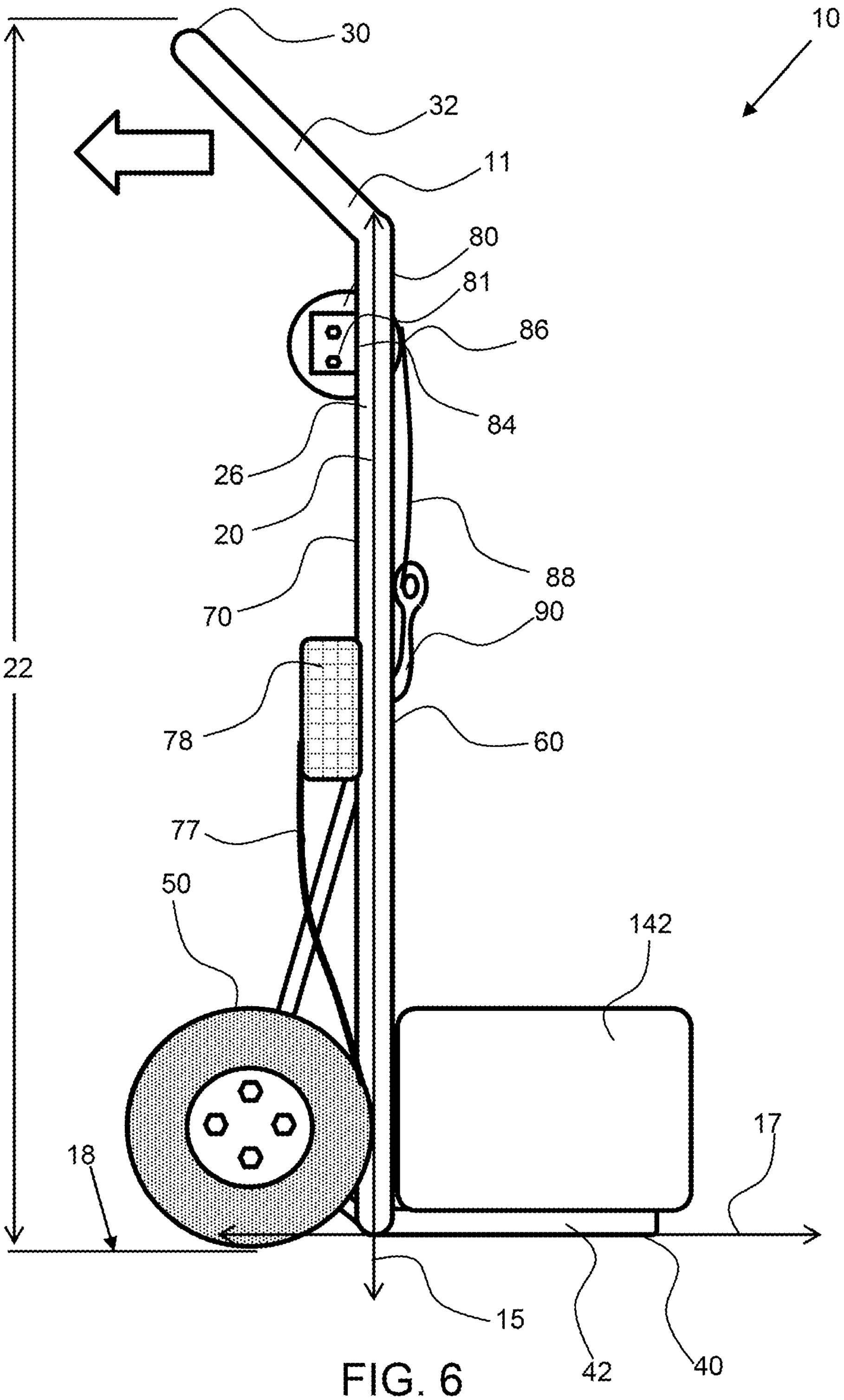
FIG. 6 shows a side view of the exemplary hand-truck lifting system with a platform object on the lift platform.

FIG. 6 shows a platform-object 142 on the lift platform 42 of the hand truck 11. The handle 32 of the hand truck can be tilted back toward the frame handle side 70 to lift the lift platform 42 and platform-object thereon up for moving the platform-object by rolling the hand truck on the wheels 50.

It will be apparent to those skilled in the art that various modifications, combinations and variations can be made in the present invention without departing from the scope of the invention. Specific embodiments, features and elements described herein may be modified, and/or combined in any suitable manner. Thus, it is intended that the present invention cover the modifications, combinations and variations of this invention provided they come within the scope of the appended claims and their equivalents.

What is claimed is:

1. A method of both lifting a lift-object and transporting a platform-object comprising:

a) providing a multifunctional hand-truck comprising:
  i) a hand-truck comprising:
    a frame comprising:
      a frame handle end;
      a frame base end opposite the frame handle end;
      a frame length extending between the frame base end and the frame handle end;
      a frame loading side;
      a frame handle side opposite the frame loading side;
      side beams extending on opposing sides of the frame forming a recessed portion between the side beams;
    a frame handle extending from the frame handle side and proximal to the frame handle end;
    a lift platform extending from the frame base end and out from the frame loading side;
    wheels attached to the frame proximal to the frame base end;
    a lift mechanism coupled to the frame proximal to the handle end on the frame handle side of the frame and offset from the frame loading side, wherein objects transported on the lift platform rest against the side beams without contacting the lift mechanism, and comprising:

an electric motor powered by a battery coupled to the frame;

a cable coupled to the motor and configured to be retracted by said motor, a pulley coupled to the frame proximal to the handle end and configured to guide the cable from the frame handle side over the pulley and down along the frame loading side;

wherein the cable extends down along the frame on the loading side to an extended end; and a lift coupler configured on an extended end of the cable;

wherein the lift platform is configured to support the frame in a vertical position when positioned on a horizontal ground surface; and wherein the lift mechanism is configured to lift a trailer tongue vertically upward toward the motor while the lift platform remains positioned on the ground surface when the lift coupler or cable is coupled to said trailer tongue and the cable is retracted by the electric motor;

b) positioning the multifunctional hand-truck with the lift platform resting on said ground surface adjacent a trailer tongue;

c) coupling the lift coupler to said trailer tongue;

d) turning on the electric motor to retract the cable and vertically lift said trailer tongue while the frame remains supported by the lift platform on the ground surface; and e) transporting said platform-object comprising:

configuring said platform-object on the lift platform;

tilting the frame back toward the frame handle side by pulling on the handle to rotate the frame about the wheels and lift the lift platform from the ground surface; and rolling the multifunctional hand-truck on the wheels to transport the platform-object.

2. The method of claim 1, wherein the frame further comprises a frame weight, wherein the frame weight is not more than 100 lbs.

3. The method of claim 1, wherein the wheels are a first wheel and a second wheel, wherein the first wheel and second wheel are configured on the frame handle side at the frame base end, and wherein a wheel axle extends through the first wheel and the second wheel.

4. The method of claim 3, wherein the frame is configured to rotate about the wheel axle in order to position the frame and lift the lift platform up from said ground surface.

5. The method of claim 1, wherein the frame is monolithic.

6. The method of claim 1, wherein the lift coupler is a hook.

7. The method of claim 1, wherein the lift coupler is a magnet.

8. The method of claim 1, wherein the lift coupler is a loop configured in the cable.

9. The method of claim 1, wherein the lift mechanism is detachably attachable to the frame.

10. The method of claim 9, wherein the lift mechanism comprises a lift-bracket configured to couple with the frame for detachably attaching the lift mechanism to said frame.

11. The method of claim 10, wherein the frame further comprises a frame-bracket for receiving the lift-bracket for retaining the lift mechanism thereon.

12. The method of claim 11, wherein the frame-bracket is configured on the handle side of the frame to enable the hand truck to secure an object along the frame loading side without interception or contact with the frame-bracket.

13. The method of claim 12, wherein the lifting mechanism is configured on the fame handle face of the frame.

14. The method of claim 12, further comprising a pulley coupled to the frame and configured to guide the cable from the lifting mechanism to the lift coupler.

15. The method of claim 12, further comprising a battery coupled to the frame and coupled electrically to the lifting mechanism to provide electrical power to the lifting mechanism.

16. The method of claim 15, further comprising a solar panel to provide electrical power to the battery to recharge the battery.

17. The method of claim 1, wherein the battery is coupled to the frame on the handle side of the frame to enable the hand truck to secure an object along the frame loading side without interception or contact with the frame-bracket.

18. The method of claim 17, further comprising a solar panel to provide electrical power to the battery to recharge the battery.

* * * * *